(12) United States Patent
Krutz et al.

(10) Patent No.: US 7,752,904 B2
(45) Date of Patent: Jul. 13, 2010

(54) STRUCTURES WITH INTEGRAL LIFE-SENSING CAPABILITY

(75) Inventors: Gary William Krutz, West Lafayette, IN (US); Keith Harmeyer, Batesville, IN (US); Michael A. Holland, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 828 days.

(21) Appl. No.: 11/425,931

(22) Filed: Jun. 22, 2006

(65) Prior Publication Data
US 2007/0131035 A1    Jun. 14, 2007

Related U.S. Application Data

(63) Continuation-in-part of application No. 11/276,500, filed on Mar. 2, 2006, now Pat. No. 7,555,936.

(60) Provisional application No. 60/595,318, filed on Jun. 22, 2005, provisional application No. 60/658,932, filed on Mar. 4, 2005.

(51) Int. Cl.
| G01L 5/00 | (2006.01) |
| G01L 1/14 | (2006.01) |
| G01L 17/00 | (2006.01) |
| G01M 17/02 | (2006.01) |
| F16L 55/00 | (2006.01) |

(52) U.S. Cl. ............... 73/146; 73/40; 73/49.1; 73/49.5; 73/763; 138/104; 138/127; 702/35; 702/185

(58) Field of Classification Search ............ 73/146, 73/49.5; 138/104, 127
See application file for complete search history.

(56) References Cited

U.S. PATENT DOCUMENTS 3,555,887 A    1/1971    Wood (Continued)

FOREIGN PATENT DOCUMENTS

DE    801864    1/1951

(Continued)

OTHER PUBLICATIONS

Matsuzaki, R. et al., "Passive Wireless Strain Monitoring of Tires Using Capacitance Change", Proc. SPIE, vol. 5394, 2004, pp. 239-247.*

(Continued)

*Primary Examiner*—Daniel S Larkin
(74) *Attorney, Agent, or Firm*—Hartman & Hartman, P.C.; Gary M. Hartman; Domenica N.S. Hartman

(57) ABSTRACT

A structure subjected to stresses that can lead to structural failure. The structure includes first and second conductive layers and an intermediate layer therebetween formed of a dielectric, semiconductive, or resistive material, such that the first, second, and intermediate layers form in combination an electrical element, namely, a capacitive or resistive element. The electrical element is located within the structure so as to be physically responsive to transitory and permanent distortions of the structure resulting from extrinsic and intrinsic sources. The structure further includes applying an electrical potential to at least one of the first and second conductive layers so as to generate an electrical signal from the electrical element, sensing changes in the electrical signal generated by the electrical element in response to the electrical element physically responding to the transitory and permanent distortions, and transmitting the changes in the electrical signal to a location remote from the structure.

45 Claims, 4 Drawing Sheets

U.S. PATENT DOCUMENTS

| | | | |
|---|---|---|---|
| 5,343,738 A | 9/1994 | Skaggs | |
| 5,378,995 A | 1/1995 | Kudo et al. | |
| 5,634,497 A | 6/1997 | Neto | |
| 5,966,018 A | 10/1999 | Edmunds et al. | |
| 5,969,618 A | 10/1999 | Redmond | |
| 5,992,218 A | 11/1999 | Tryba et al. | |
| 6,386,237 B1 | 5/2002 | Chevalier et al. | |
| 6,498,991 B1 | 12/2002 | Phelan et al. | |
| 6,958,615 B2 | 10/2005 | Poulbot et al. | |
| 7,251,991 B2 * | 8/2007 | Sergio et al. | 73/146 |
| 2003/0164048 A1 | 9/2003 | Shkel | |

FOREIGN PATENT DOCUMENTS

| | | |
|---|---|---|
| EP | 1526367 | 4/2005 |
| WO | 2004002758 | 1/2004 |
| WO | 2005002884 | 1/2005 |

OTHER PUBLICATIONS

Matsuzaki, R. et al., "Wireless Strain Monitoring of Tires Using Electrical Capacitance Changes with an Oscillating Circuit", Sensors and Actuators A, vol. 119, Apr. 2005, pp. 323-331.*

Todoroki, A. et al., "Wireless Strain Monitoring Using Electrical Capacitance Change of Tire: Part I—With Oscillating Circuit", Smart Materials and Structures, vol. 12, May 6, 2003, pp. 403-409.*

Todoroki, A. et al., "Wireless Strain Monitoring Using Electrical Capacitance Change of Tire: Part II—Passive", Smart Materials and Structures, vol. 12, May 6, 2003, pp. 410-416.*

Ian Radtke, Dr. Gary Krutz, Aaron D. Deckard; "Design of Power-Transmitting Hydraulic Hose with Integrated Controller Area Network and Life-Sensing Capability"; 2005 ASAE Agricultural Equipment Technology Conference; Louisville, Kentucky, Feb. 13-15, 2005.

M. Sergio, N. Manaresi, M. Tartagni, R. Canegallo and R. Guerrieri; On a road tire deformation measurement system using a capacitive-resistive sensor; 0964-1726/06/061700; published Oct. 10, 2006; IOP Publishing.

* cited by examiner

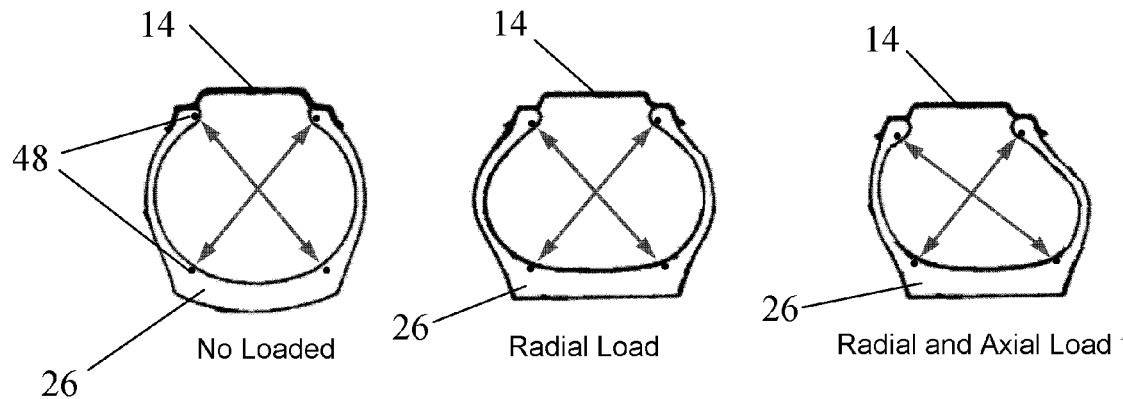
FIG. 9
FIG. 10
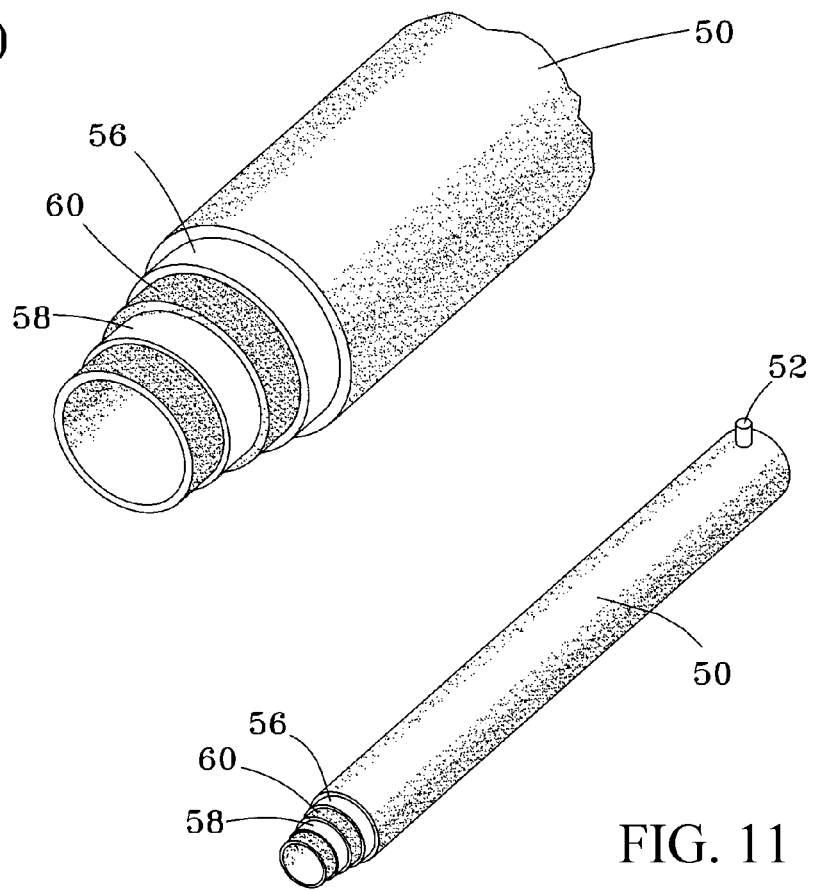
FIG. 11

STRUCTURES WITH INTEGRAL LIFE-SENSING CAPABILITY

CROSS REFERENCE TO RELATED APPLICATIONS

This application claims the benefit of U.S. Provisional Application No. 60/595,318, filed Jun. 22, 2005, and is a continuation-in-part patent application of U.S. patent application Ser. No. 11/276,500, filed Mar. 2, 2006, now U.S. Pat. No. 7,555,936, which claims the benefit of U.S. Provisional Application No. 60/658,932, filed Mar. 4, 2005. The contents of these prior applications are incorporated herein by reference.

BACKGROUND OF THE INVENTION

The present invention generally relates to structures subject to stresses that can lead to structural failure, such as structures that contact or contain static or flowing fluids, examples of which include tires, airfoils, and pipes of types used in mobile machinery, automotive, aerospace, manufacturing, and process equipment. More particularly, this invention relates to structures equipped with life-sensing means in terms of wear, fatigue, and/or other structural breakdowns within the structure, and means for transmitting an output of the sensing means to detect an impending structural failure.

Ongoing interest exists in developing methods for detecting the failure of conduits that transport fluids. For example, U.S. Pat. No. 5,634,497 to Neto, U.S. Pat. No. 6,386,237 to Chevalier et al., and U.S. Pat. No. 6,498,991 to Phelan et al. disclose the detection of a worn hose by sensing the electrical resistivity in one or more wires embedded in the wall of the hose. These patents focus on detecting a discontinuity in the embedded wires, such as would result from breakage of the wires due to wear as opposed to sensing a gradual increase in resistivity attributable to wear or deformation of the hose or its wires.

U.S. Pat. No. 5,343,738 to Skaggs differs by disclosing a method for capacitively sensing the failure of a hose. In Skaggs, a fuel leakage through an inner layer of a hose is sensed on the basis of the leaked fuel altering the dielectric properties of an insulating material between a pair of copper wires embedded in the hose. Similar to Skaggs, U.S. Pat. No. 5,992,218 to Tryba et al. discloses sensing water leakage through a hose on the basis of the leaked water increasing the conductivity of an electrical insulating layer between a pair of conductor layers separated by the insulating layer. U.S. Pat. No. 5,969,618 to Redmond also discloses a method for detecting the failure of a hose on the basis of electrical conductivity. Redmond's hose is formed to have an annulus containing separated wires, and the failure of the inner layer of the hose is sensed when fluid leaks into the annulus and closes an electric circuit containing the wires.

Another approach to sensing an impending failure of a hose is disclosed in U.S. Pat. No. 4,446,892 to Maxwell. Maxwell discloses a fluid (oil) transport hose formed by at least two plies and a sensing element therebetween. In one embodiment of Maxwell, the sensing element is responsive to the electromagnetic properties of fluid present between the plies as a result of a failure of an inner ply of the hose. In a second embodiment of Maxwell, the sensing element is responsive to the failure of an inner ply of the hose by presenting an open circuit. The sensing element is said to preferably be a coil of fine wire wrapped around the inner ply and connected to means responsive to changes in the electrical impedance (AC) of the coil. Such changes are said to occur from fluid seepage into the material contacting with the coil or deformation of the inner ply, both of which change the inductance of the coil. In an alternative embodiment in which the sensing element is primarily intended to be responsive to the seepage of fluid (oil) between the plies of the hose, Maxwell employs parallel non-touching wires connected to means responsive to a change in conductance between the individual wires or to a change in the capacitance between the wires.

The prior art discussed above is particularly concerned with conduits through which a fluid is conveyed from one location to another, as opposed to fluid vessels such as hydraulic hoses, pipes, and tires in which little if any flow may occur and/or in which structural fatigue of a vessel wall from pressure cycles is often the most important factor in the life of the vessel. Furthermore, sensing systems of the type suggested by Maxwell are generally useful in relatively low pressure systems where the detection of seepage within the hose wall could provide an adequate warning of impending failure. However, in vessels subjected to fluids at relatively high pressures, once seepage occurs catastrophic failure is likely to occur in a matter of seconds, not hours or even minutes. Therefore, it would be desirable to sense an imminent fatigue failure of a relatively high-pressure vessel, as well as other structures subjected to high cyclical pressures. It would also be desirable to predict when a structural failure of such structures will occur, so that the structure can be safely used for its full life and then replaced before any damage occurs to any fluid system containing the structure or to any objects surrounding the structure.

BRIEF SUMMARY OF THE INVENTION

The present invention provides a structure of a type that is subjected to stresses which can lead to structural failure. Such structures particularly include those that contact or contain a static or flowing fluid at high pressures, including tires, airfoils, and pipes of types used in mobile machinery, automotive, aerospace, manufacturing, and process equipment. The structure is equipped with means responsive to distortions within the structure caused by extrinsic and intrinsic sources, such as the result of external forces applied to the structure and internal forces created as a result of wear, fatigue, and/or other structural breakdowns within the structure, so as to be capable of detecting an impending structural failure.

According to the invention, the structure includes first and second conductive layers and an intermediate layer therebetween formed of a dielectric, semiconductive, or resistive material, such that the first, second, and intermediate layers form in combination an electrical element, namely, a capacitive or resistive element. The electrical element is located within the structure so as to be physically responsive to transitory and permanent distortions of the structure resulting from extrinsic and intrinsic sources. The structure further includes means for applying an electrical potential to at least one of the first and second layers so as to generate an electrical signal from the electrical element, means for sensing changes in the electrical signal generated by the electrical element in response to the electrical element physically responding to the transitory and permanent distortions, and means for transmitting the changes in the electrical signal to a location remote from the structure.

As applied to particular structures, such as tires, airfoils, pipes, etc., the conductive layers can be in the form of structural reinforcement layers, as well as passive layers that do not positively or negatively affect the overall structural integrity of the structure. Various sensing techniques can be utilized with the invention that are responsive to distortions in the first, second, and/or intermediate layers. In tire applications, such responsiveness can be used to monitor regular cyclic loading as the tire rotates, as well as irregular loading or load distributions that occur from changing road and vehicle dynamics, cuts and punctures in the tire, excessive speed or load, tire imbalance, bruising, impacts with curbs, hardening, improper mounting and damage during mounting, impending tread separation, impending burst failure, etc. As such, by monitoring distortions resulting from a variety of sources, the present invention provides the capability of continuously monitoring a structure and eventually removing the structure from service before a catastrophic failure occurs.

Other objects and advantages of this invention will be better appreciated from the following detailed description.

BRIEF DESCRIPTION OF THE DRAWINGS

FIG. 9 schematically represents the inclusion of proximity sensors to assist in monitoring a tire in accordance with the present invention.

FIGS. 10 and 11 show different views of a pipe with a pair of conductive layers separated by a intermediate layer to form an electrical circuit in accordance with the present invention.

DETAILED DESCRIPTION OF THE INVENTION

As represented in FIGS. 1 through 11, the present invention involves creating an electrical circuit within a manufactured structure subjected to high cyclical or intermittent forces, including but not limited to relatively high-pressure vessels such as tires, pipes, etc., and sensing changes in the electrical circuit that occur in response to transitory and permanent distortions of the structure. Such distortions can be the result of extrinsic and intrinsic sources, including extraneously applied forces and internal forces resulting from wear, fatigue, and other structural breakdowns within the structure. The electrical circuit contains conductive layers separated by dielectric, semiconductive, or resistive layers to form one or more capacitive or resistive elements by which changes in capacitance, resistance, or inductance can be sensed. The layers of the circuit are configured to enable sensing of an imminent fatigue failure, remaining life, and damage to the high-pressure structure, and can be coupled to data processing circuitry capable of predicting when a structural failure of the structure will occur, so that the structure can be safely used for its full life and then replaced before any damage occurs to any system containing the structure or to any objects surrounding the structure.

The invention can be applied to essentially any structure capable of having a multilayer wall construction for contacting or containing a flowing or static fluid under relatively high pressure. Notable examples include pneumatic tires and pipes. In the context of tires, the invention is also applicable to solid tires, such as solid rubber tires that can be constructed to contain multiple layers near their treads. Other applications include composite aircraft wings made up of multiple layers, whose outer airfoil surfaces are subjected to cyclical or intermittent forces resulting from changes in air pressure, etc.

Figure 1:
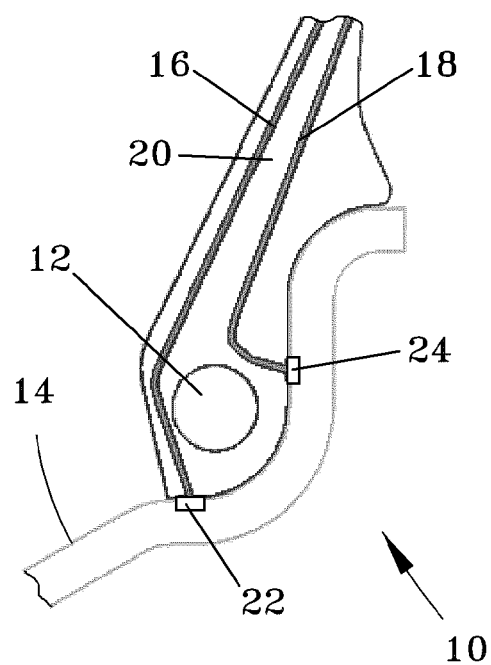
FIG. 1 is a cross-section through a bead of a tire sealed against a rim, and shows a pair of conductive layers within the tire separated by an intermediate layer to form an electrical circuit in accordance with an embodiment of the invention.

FIG. 1 is a cross-section through a bead 12 of a tire 10 sealed against a rim 14 (either the inside or outside rim side), and shows a pair of conductors 16 and 18 within the tire 10 separated by an intermediate layer 20. The conductors 16 and 18 are individually connected to conductive strips 22 and 24 on the rim 14 that are electrically insulated from the rim 14, assuming the rim 14 is formed of an electrically conductive material. The intermediate layer 20 may be formed of a dielectric material such that the conductors 16 and 18 and intermediate layer 20 form a capacitor, or may be formed of a semiconductive or electrically resistive material such that the conductors 16 and 18 and intermediate layer 20 form a resistive circuit. As will be evident from the following discussion, the conductors 16 and 18 and intermediate layer 20 can be a functionally active or passive components of the tire construction.

Figure 2:
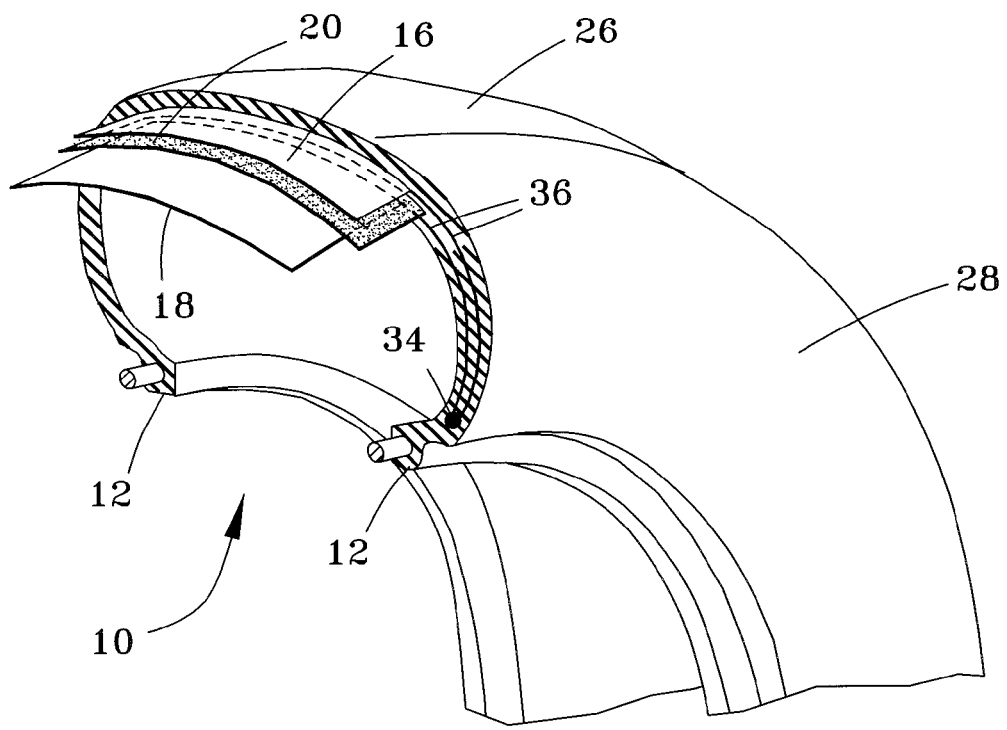
FIG. 2 is a perspective view of a tire with partial cutaways to expose conductive and intermediate layers located within the tread of the tire in accordance with an embodiment of the present invention.

FIG. 2 is a partial cutaway view of the tire 10, in which the conductors 16 and 18 and intermediate layer 20 of FIG. 1 are represented as including or otherwise electrically integrated with three layers immediately adjacent the tread 26 of the tire 10. As such, these layers are hereinafter referred to as conductive layers 16 and 18 and intermediate layer 20. As evident from FIG. 2, essentially the entire tire 10 is a circuit containing an electrical inductive or resistive sensing of changes in the thickness or electrical conductivity of the layer 20. By applying a voltage across the layers 16 and 18 via the conductive strips 22 and 24 (FIG. 1), an electrical signal is generated that can be detected and wirelessly transmitted by a transmitting device 34 to a receiving unit (not shown) installed on the vehicle to which the tire 10 is mounted. The transmitting device 34 can use, for example, existing pressure sensor and chip technology developed to monitor tire pressure. The transmitting device 34 preferably contains circuitry to process the raw analog data resulting from the electrical signal, perform analog-to-digital data conversion, and transmit the digital data wirelessly to the remote receiving unit, such as a node of a vehicle controller network. Conditions within and beneath the tread 26 are not desirable for the transmitting device 34 because of, for example, excessive accelerations. Therefore, the transmitting device 34 is shown embedded in one of the sidewalls 28, preferably adjacent the rim 14, so that the device 34 is located where acceleration levels are minimized. Conductive transmission elements 36 preferably interconnect the transmitting device 34 with the conductive and intermediate layers 16, 18, and 20 that form the sensing element of this invention. To inhibit failure from fatigue, the transmission elements 36 can be formed from extremely thin metal components in the sidewalls 28. One such example would be the use of coated photo-etched strands that can be made in thicknesses of as little as about 0.0005 inch (about ten micrometers) from a wide variety of metals. Alternatively, the transmission elements 36 can be defined by conductive rubber paths selectively formed in the sidewalls 28.

Figure 3:
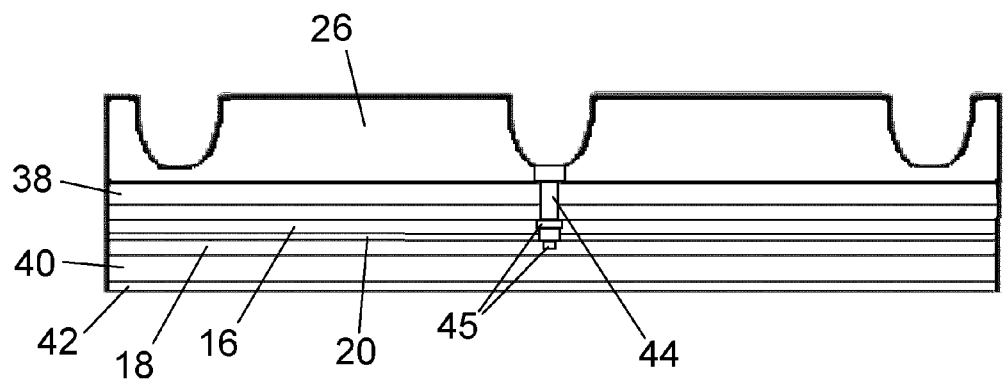
FIGS. 3 and 4 schematically represent cross-sectional views through the tread of a tire and show sensor inserts that can be used to electrically connect to conductive layers within the tread of the tire in accordance with yet another embodiment of the present invention.
Figure 4:
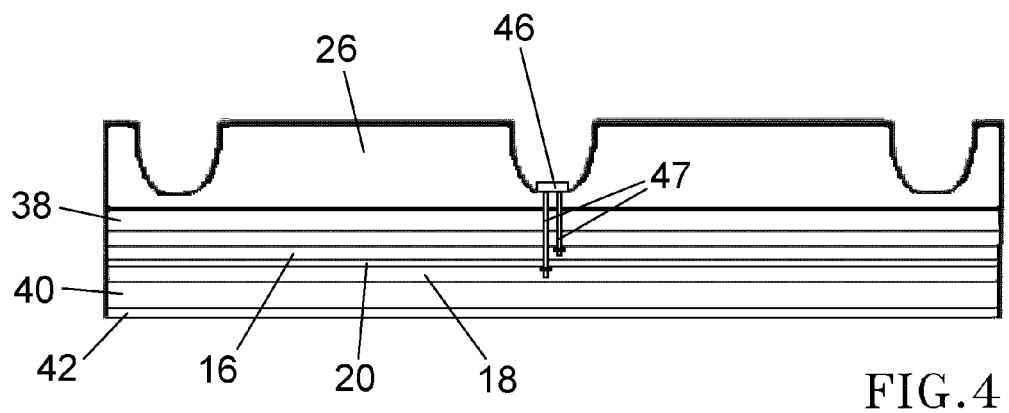

FIGS. 3 and 4 schematically represent another alternative transmission technique that makes use of sensor/transmitter inserts 44 and 46 to electrically connect to the conductive layers 16 and 18 within the tire 10 of FIG. 2. The inserts 44 and 46 preferably contain the circuitry required to receive, process, and transmit the electrical signals from the conductive layers 16 and 18, and may be powered by a battery (not shown), an induced current, or another less conventional method. The inserts 44 and 46 are shown as capable of being installed in the tire 10 through the exterior of the tire tread 26, though other locations are possible, including the sidewalls 28 and beads 12. For a better understanding of FIGS. 3 and 4, the layers of the tire 10 are generally depicted to include the tread 26, an under-tread material 38, the conductive layers 16 and 18, the intermediate layer 20, a body ply 40, and an inner liner 42. In FIG. 3, the insert 44 is represented as being of a type that is preferably forced into a preformed hole and secured with adhesive. The insert 44 has multiple contact points 45 for contact with the conductive layers 16 and 18, and a blunt end to avoid puncturing the inner liner 42 of the tire 10. In FIG. 4, the insert 46 has two pin-like contacts 47, each going to a different conductive layer 16 or 18 in the tire 10. The insert 46 is configured to be forcibly pushed into the tire 10 and held in place with barbs on the contacts 47. The head of the insert 46 on the tire exterior preferably contains the circuitry and transmitter and can serve to limit the penetration of the contacts 47 to prevent puncturing of the inner liner 42. An advantage of the inserts 44 and 46 is that they can be installed in the tire 10 after constructing and curing the tire 10 to protect their electronic components from the harsh conditions experienced during the curing process. Additional advantages with this approach include the ability to check the tire 10 for defects before shipping, and the ability for replacement in case of a malfunction or defect.

A dielectric intermediate layer 20 formed of a silicon-based dielectric material has been shown to achieve a capacitive sensitivity of ten to one when placed between layers 16 and 18 formed of a metal. Though rubber materials of the type conventionally used in tire manufacture would exhibit reduced sensitivity, a sensitivity of even two to one (or possibly less) is believed to be attainable with such materials and acceptable for use with this invention. As such, each of the conductive and intermediate layers 16, 18, and 20 may be formed of a base material of rubber, steel, or other materials that are conventionally used in tire construction, and whose electrical properties can be modified as necessary to obtain the desired conductive/resistive electrical properties for the particular layer 16, 18, and 20. For example, materials of the type conventionally used as steel reinforcement bands in tires can be used as the conductive layers 16 and 18. Concentric conductive layers 16 and 18 of this type can have a conventional construction, size, and shape similar to steel reinforcement bands widely used in tire construction, or differ in any of these characteristics. As an alternative, either or both of the conductive layers 16 and 18 could be formed by increasing the conductivity of an elastomeric (e.g., rubber) layer of the tire 10 through additions of conductive materials during rubber compounding. By applying an electric current to one of the conductive layers 16 or 18, capacitance can be measured to capture changes in the distance between the conductive layers 16 and 18.

Figure 5:
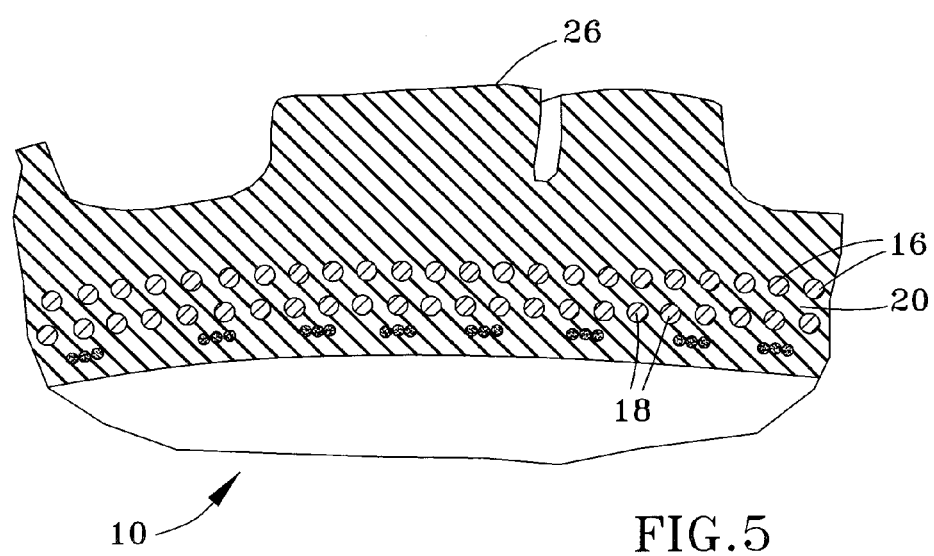
FIG. 5 is a cross-section through the tread of a tire and shows belt wires that can be used as conductive layers within the tire of FIG. 2 in accordance with another embodiment of the present invention.
Figure 6:
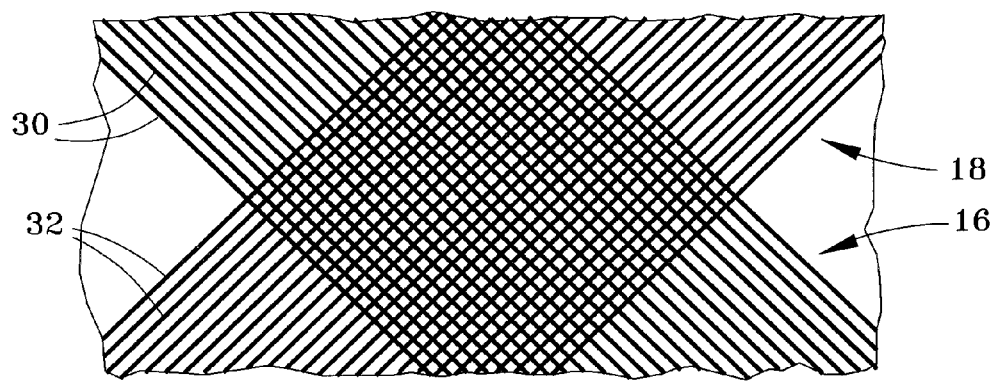
FIGS. 6 and 7 show two alternative patterns for belt wires that can be used as conductive layers for the tire of FIG. 2 in accordance with the invention.
Figure 7:
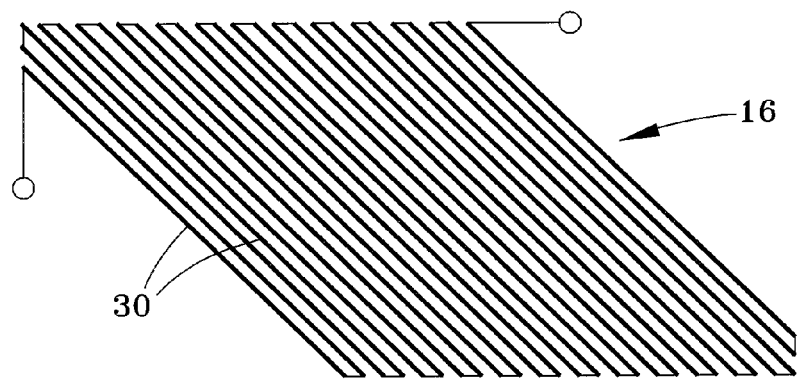

Another alternative is available with existing tire constructions reinforced with steel wire belts whose individual wires are electrically isolated from each other. An example of this type of tire construction is depicted in FIG. 5, which shows the two conductive layers 16 and 18 formed by two sets of wires 30 and 32, in which each wire 30 and 32 is electrically insulated from the other wires 30 and 32, and the layers 16 and 18 formed by the sets of wires 30 and 32 are separated by a dielectric (e.g., rubber) intermediate layer 20. FIG. 6 depicts a plan view of a typical arrangement for this type of reinforcement, in which the multiple wires 30 of the conductive layer 16 are orthogonal to the multiple wires 32 of the other conductive layer 18. Pairs of these wires 30 and 32 within either or both conductive layers 16 and 18 can be coupled to form multiple capacitors within the tire 10. Another alternative is to modify this type of reinforcement belt by electrically connecting the wires 30 or 32 in series as depicted in FIG. 7, so that either or both conductive layers 16 and 18 define continuous conductive paths around the tire 10.

Figure 8:
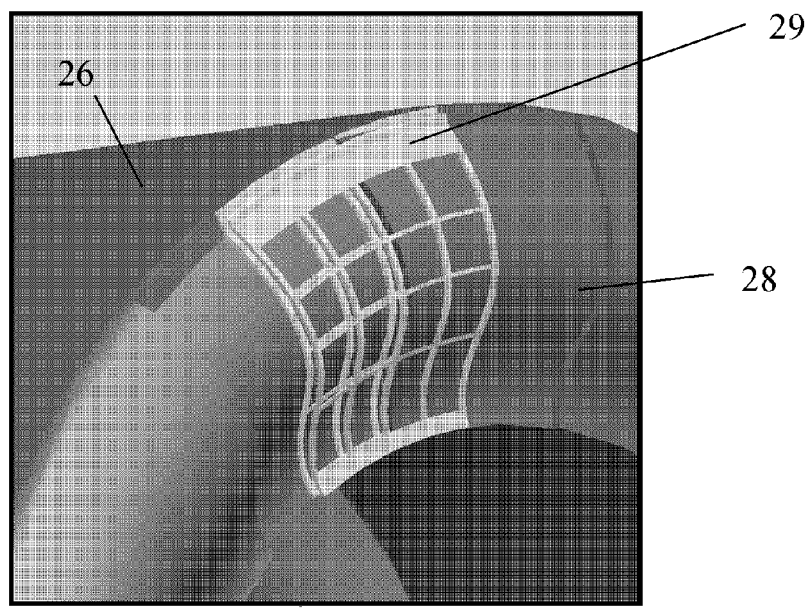
FIG. 8 schematically represents the inclusion of a grid to assist in monitoring the sidewalls of a tire in accordance with the present invention.

The performance and condition of the tire 10 can also be monitored by locating sensing structures within the sidewalls 28 of the tire 10. For example, sidewall performance and loading can be monitored with measurements taken from the sidewalls 28 to directly or indirectly observe road and vehicle dynamics that may provide an indication of loss of control and, in the case of freight trucks, indicate unsafe conditions due to overloading. For this purpose, another optional feature of the present invention is to provide one or more capacitive grids in the sidewalls 28 of the tire 10 that are separate from the conductive and intermediate layers 16, 18, and 20. As represented in FIG. 8, each grid 29 can be located similar to the transmission elements 36 seen in FIG. 2, and powered and sensed in a manner similar to the layers 16, 18, and 20 as represented in FIGS. 1 and 2. The grids 29 can have a variety of alternative configurations, and the size and number of grids 29 can be tailored to achieve the desired level of sensitivity. For example, twelve individual grids 29 could be incorporated into each sidewall 28 around the perimeter of the tire 10, with the grids 29 spaced about thirty degrees apart. Side-loading of the sidewalls 28 can be further monitored with optical or other types of proximity sensors 48 to measure the distance between, for example, the tire beads 12 and the corners of the tread 26, as schematically represented in FIG. 9. Pressure and temperature may also be measured with appropriate sensors (not shown) to further monitor the condition of the tire 10.

The resulting combination of a dielectric intermediate layer 20 with the conductive layers 16 and 18 forms a capacitor consistent with the previous embodiments. This approach also permits detection of electrical currents sent separately through the conductive layers 16 and 18, with changes in conductivity (resistance) evidencing strain and eventual breakage of the reinforcement wires 30 and 32 within these layers 16 and 18.

Those skilled in the art will appreciate that the conductive layers 16 and 18 as configured in FIGS. 2 through 7 are conducive to being incorporated into a variety of structures subjected to cyclical or intermittent loading, including aircraft wings and other airfoils capable of having laminate constructions. For example, the orthogonal sets of wires 30 and 32 that define the conductive layers 16 and 18 can be formed of an electrically conductive material that may contribute to the strength or toughness of a wing, or at least have negligible adverse impact on the structural properties of the wing.

As noted above, an alternative to capacitive sensing involves forming the intermediate layer 20 of a semiconductive or resistive material. For example, the two conductive layers 16 and 18 (e.g., of a type discussed above) can be separated by a semiconductive intermediate layer 20 formed of a conductive adhesive or a rubber material whose conductivity is increased with carbon or another conductive material. By passing a current through the three conductive and intermediate layers 16, 18, and 20, resistance can be measured, with the resistance level depending on the condition of the three materials that form the conductive and intermediate layers 16, 18, and 20.

By locating the conductive and intermediate layers 16, 18, and 20 immediately beneath the tread 26 of the tire 10 (or, for example, within the sidewalls 28 of the tire 10), the conductive and intermediate layers 16, 18, and 20 are subjected to regular cyclic loading as the tire 10 rotates, as well as irregular loading or load distributions that occur from changing road and vehicle dynamics, cuts, excessive speed, punctures, imbalance, bruising, impacts with curbs, hardening, improper mounting or damage during mounting, impending tread separation, and impending burst failure. As a result, the conductive and intermediate layers 16, 18, and 20 are subject to physical distortions, both transient and permanent, that alter the electrical signal generated when a voltage is applied across the layers 16 and 18. By detecting and appropriately processing the electrical signal, trends and abrupt changes in the condition of the tire 10 can be sensed that indicate such things as vehicle control characteristics (skidding, swerving, etc.), vehicle loading characteristics (overloading), condition of the tread 26 (tread life, separation, and/or damage), etc.

FIGS. 10 and 11 show cutaway views of the invention applied to a pipe 50, and particularly a multilayer pipe 50 formed of plastic, rubber, or other relatively flexible materials that are susceptible to fatigue failure. In FIGS. 10 and 11, the pipe 50 is represented as having two conductive layers 56 and 58 separated by an intermediate layer 60 formed of a dielectric, semiconductive, or resistive material. Together, these layers 56, 58, and 60 form capacitive, inductive, or resistive circuits as described for the embodiments of FIGS. 1 through 8. FIG. 11 shows a connector 52 for the two conducting layers 56 and 58 at one end of the pipe 50. The connector 52 is preferably integrated into a coupling flange (not shown), and can be attached with a termination coupler (not shown) to measure fatigue and breakdown of the pipe wall on the basis of the same sensing capabilities as the tire 10 of FIGS. 1 through 8. As an example, a length of the pipe 50 could be equipped with sensing circuitry at one of its ends, with additional sensing circuitry periodically located along the length of the pipe 50 to sense individual sections of the layers 56, 58, and 60, or to sense two sections of the layers 56, 58, and 60 with a multiplexer between. A hose coupler can be adapted to make electrical contact with the conductive layers 56 and 58 within the pipe 50.

While the invention has been described in terms of specific embodiments, it is apparent that other forms could be adopted by one skilled in the art. For example, the physical configuration of the tire 10 and pipe 50 could differ from that shown, and materials and processes other than those noted could be use. Therefore, the scope of the invention is to be limited only by the following claims.

The invention claimed is:

1. A structure having an integral life-sensing capability, the structure comprising:
   first and second conductive layers and an intermediate layer therebetween, the intermediate layer being formed of a material chosen from the group consisting of dielectric, semiconductive, and resistive materials such that the first, second, and intermediate layers form in combination an electrical element chosen from the group consisting of capacitive and resistive elements, the electrical element being located within the structure so as to be physically responsive to transitory and permanent distortions of the structure resulting from extrinsic and intrinsic sources;
   means for applying an electrical potential to at least one of the first and second conductive layers so as to generate an electrical signal from the electrical element, the electrical signal being a capacitive, resistive, or inductive signal;
   means for sensing changes in the electrical signal generated by the electrical element in response to the electrical element physically responding to the transitory and permanent distortions; and
   means embedded in the structure for transmitting the changes in the electrical signal to a location remote from the structure;
   wherein the electrical element is configured to sense an imminent fatigue failure, remaining life, and damage to the structure, and is coupled to data processing circuitry adapted to predict when a structural failure of the structure will occur.

2. The structure according to claim 1, wherein the structure is a tire.

3. The structure according to claim 1, wherein the structure is an airfoil.

4. The structure according to claim 1, wherein the structure is a pipe, and the first and second conductive layers are radially inner and outer layers of the pipe.

5. The structure according to claim 1, further comprising means for sensing an electrical discontinuity in at least one of the first and second conductive layers.

6. The structure according to claim 1, wherein the sensing means is embedded in the structure.

7. The structure according to claim 1, further comprising means embedded in the structure for electrically interconnecting the first and second conductive layers with the sensing means.

8. The structure according to claim 1, wherein the intermediate layer is formed of a dielectric material.

9. The structure according to claim 1, wherein the intermediate layer is formed of a semiconductor material.

10. The structure according to claim 1, wherein the intermediate layer is formed of a resistive material.

11. The structure according to claim 1, wherein each of the first and second conductive layers comprises a plurality of parallel wires.

12. The structure according to claim 11, wherein the parallel wires of the first conductive layer are substantially orthogonal to the parallel wires of the second conductive layer.

13. The structure according to claim 11, wherein the parallel wires of at least one of the first and second conductive layers are electrically insulated from each other so as to define at least one capacitive couple that generates a capacitive signal.

14. The structure according to claim 13, further comprising means for sensing changes in the capacitive signal generated by the capacitive couple.

15. The structure according to claim 11, wherein the parallel wires of at least one of the first and second conductive layers are electrically connected in series with each other to define a continuous conductor.

16. The structure according to claim 15, further comprising means for sensing changes in the resistance of the continuous conductor.

17. A structure having an integral life-sensing capability, the structure comprising:

a tire comprising a tread at an outer peripheral surface of the tire, two sidewalls adjoining the tread and extending radially inward therefrom, and beads at radially inward edges of the sidewalls;

first and second conductive layers and an intermediate layer therebetween, the intermediate layer being formed of a material chosen from the group consisting of dielectric, semiconductive, and resistive materials such that the first, second, and intermediate layers form in combination an electrical element chosen from the group consisting of capacitive and resistive elements, and the electrical element is located within the structure and at least in one of the tread and the sidewalls of the tire so as to be physically responsive to transitory and permanent distortions of the structure resulting from extrinsic and intrinsic sources;

means for applying an electrical potential to at least one of the first and second conductive layers so as to generate an electrical signal from the electrical element;

means for sensing changes in the electrical signal generated by the electrical element in response to the electrical element physically responding to the transitory and permanent distortions; and means for transmitting the changes in the electrical signal to a location remote from the structure;

wherein the electrical element is configured to sense an imminent fatigue failure, remaining life, and damage to the structure, and is coupled to data processing circuitry adapted to predict when a structural failure of the structure will occur.

18. The structure according to claim 17, wherein the first and second conductive layers are concentric with the tread.

19. The structure according to claim 18, wherein each of the first and second conductive layers is a reinforcement layer of the tire.

20. The structure according to claim 18, wherein each of the first and second conductive layers is a conductive elastomeric layer of the tire.

21. The structure according to claim 18, wherein each of the first and second conductive layers comprises a plurality of parallel wires.

22. The structure according to claim 21, wherein the parallel wires of the first conductive layer are substantially orthogonal to the parallel wires of the second conductive layer.

23. The structure according to claim 21, wherein the parallel wires of at least one of the first and second conductive layers are electrically insulated from each other so as to define at least one capacitive couple that generates a capacitive signal.

24. The structure according to claim 23, further comprising means for sensing changes in the capacitive signal generated by the capacitive couple.

25. The structure according to claim 21, wherein the parallel wires of at least one of the first and second conductive layers are electrically connected in series with each other to define a continuous conductor.

26. The structure according to claim 25, further comprising means for sensing changes in the resistance of the continuous conductor.

27. The structure according to claim 17, wherein the tire is mounted on a rim, and the applying means is disposed on the rim.

28. The structure according to claim 17, wherein the sensing means is embedded in one of the sidewalls of the tire.

29. The structure according to claim 17, wherein the transmitting means is embedded in one of the sidewalls of the tire.

30. The structure according to claim 17, wherein the sensing and transmitting means are within an insert removably embedded in an exterior region of the tire.

31. The structure according to claim 17, further comprising means for sensing proximity of at least one of the beads of the tire and at least one corner of the tread of the tire.

32. A structure having an integral life-sensing capability, the structure comprising:

a tire comprising a tread at an outer peripheral surface of the tire, two sidewalls adjoining the tread and extending radially inward therefrom, and beads at radially inward edges of the sidewalls;

first and second conductive layers and an intermediate layer therebetween, the intermediate layer being formed of a material chosen from the group consisting of dielectric, semiconductive, and resistive materials such that the first, second, and intermediate layers form in combination an electrical element chosen from the group consisting of capacitive and resistive elements, and the electrical element is located within the structure and at least in one of the tread and the sidewalls of the tire so as to be physically responsive to transitory and permanent distortions of the structure resulting from extrinsic and intrinsic sources;

means for applying an electrical potential to at least on of the first and second conductive layers so as to generate an electrical signal from the electrical element;

means for sensing changes in the electrical signal generated by the electrical element in response to the electrical element physically responding to the transitory and permanent distortions; and means for transmitting the changes in the electrical signal to a location remote from the structure;

wherein the transmitting means is embedded in one of the sidewalls of the tire.

33. The structure according to claim 32, wherein the first and second conductive layers are concentric with the tread.

34. The structure according to claim 33, wherein each of the first and second conductive layers is a reinforcement layer of the tire.

35. The structure according to claim 33, wherein each of the first and second conductive layers is a conductive elastomeric layer of the tire.

36. The structure according to claim 33, wherein each of the first and second conductive layers comprises a plurality of parallel wires.

37. The structure according to claim 36, wherein the parallel wires of the first conductive layer are substantially orthogonal to the parallel wires of the second conductive layer.

38. The structure according to claim 36, wherein the parallel wires of at least one of the first and second conductive layers are electrically insulated from each other so as to define at least one capacitive couple that generates a capacitive signal.

39. The structure according to claim 38, further comprising means for sensing changes in the capacitive signal generated by the capacitive couple.

40. The structure according to claim 36, wherein the parallel wires of at least one of the first and second conductive layers are electrically connected in series with each other to define a continuous conductor.

41. The structure according to claim 40, further comprising means for sensing changes in the resistance of the continuous conductor.

42. The structure according to claim 32, wherein the tire is mounted on a rim, and the applying means is disposed on the rim.

43. The structure according to claim 32, wherein the sensing means is embedded in one of the sidewalls of the tire.

44. The structure according to claim 32, wherein the sensing and transmitting means are within an insert removably embedded in an exterior region of the tire.

45. The structure according to claim 32, further comprising means for sensing proximity of at least one of the beads of the tire and at least one corner of the tread of the tire.

* * * * *